July 15, 1952 — E. E. SHELDON — 2,603,757
PHOTOCATHODE
Filed Nov. 5, 1948
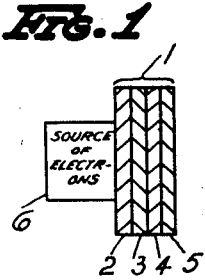
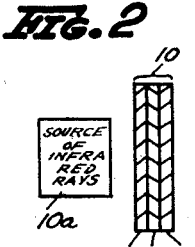
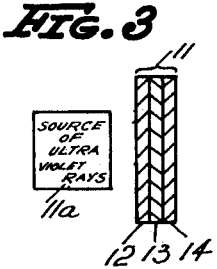
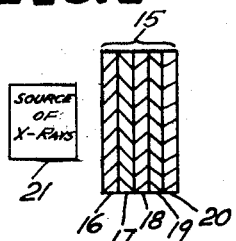
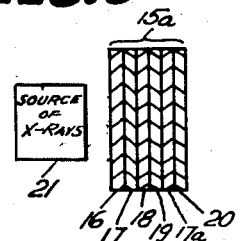
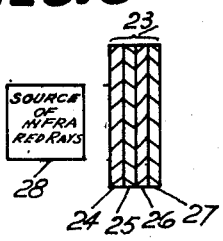
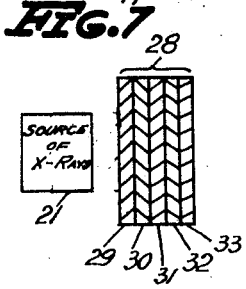
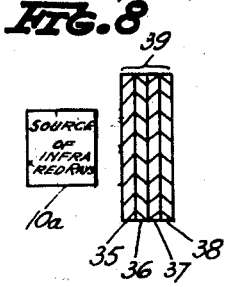
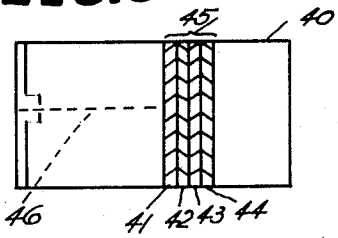
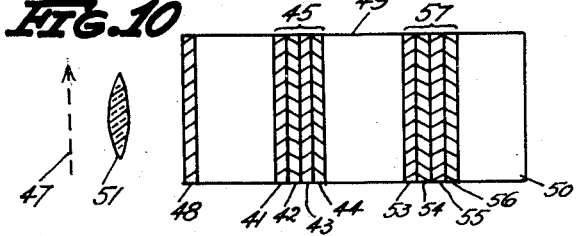
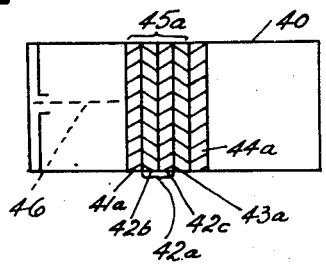
INVENTOR.
EDWARD EMANUEL SHELDON
BY Julian J. Wittal
ATTORNEY Patented July 15, 1952

2,603,757

UNITED STATES PATENT OFFICE 2,603,757

PHOTOCATHODE

Edward Emanuel Sheldon, New York, N. Y.

Application November 5, 1948, Serial No. 59,661

4 Claims. (Cl. 313—94)

This invention relates to novel type of photocathodes for efficient picking up of signals or complete images produced by different types of invisible radiations and to novel type of electrodes for intensification of said signals or images produced by invisible radiations.

The purpose of my invention is to provide photocathodes which will efficiently respond to invisible light radiation, as well as to atomic particles radiation.

Another purpose of this invention is to provide photocathodes for conversion of signals or images of one type of radiation into another type of radiation.

Another purpose of this invention is to preserve fidelity of reconverted signals or images in relation to the original signals or images.

Another purpose of this invention is to provide a universal electrode for intensification of signals or images, which is responsive to all types of radiation.

The present photocathodes are made of photoemissive, photo-conductive or of photo-voltaic layer on a suitable supporting base. These photocathodes respond well to visible light. They are, however, very insensitive to infra-red radiation of wave-length longer than one micron and on the other end of the spectrum to rays of wavelength shorter than 2000 A. These photocathodes are also completely insensitive to electron or other atomic particles radiation. Limitations of the present photocathodes were eliminated in my invention by the use of composite photocathodes comprising in combination light reflecting layer transparent to exciting radiation, fluorescent layer, light transparent layer and photo-sensitive layer disposed in a suitable vacuum tube. This novel photocathode may be used in every signal or image reproducing system, as well as in every signal or image transmitting system such as, phototubes, electron-multiplier tubes, in image converters, in image amplifiers, and in television pick-up tubes. By using this novel photocathode the invisible exciting radiation is converted in the fluorescent layer of said composite photocathode into fluorescent light of wave length to which the photo-sensitive layer of said photocathode is most sensitive. The fluorescent light is exciting said photo-sensitive layer directly and by reflection from said reflecting layer, whereby any loss of fluorescent light is prevented increasing markedly the efficiency of this novel photocathode. In this way radiation which would be too weak to excite the conventional photocathode may now produce photo-electric effect. The sensitivity of the novel photocathode is further increased by elimination of the optical system for projection of the signals or images on the photocathode. In the conventional photocathode the signals or images after their conversion into type of radiation to which said photocathode is sensitive, have to be projected thereon by means of optical system. The use of the optical system causes loss of 95% of radiation because of absorption. Elimination of the optical system would obviously result in complete deterioration of the sharpness of projected image on the conventional photocathode. In my invention, this cause of the loss of illumination is removed without impairing sharpness of the image, because of close apposition of fluorescent and photo-sensitive layers. This is equivalent to 20-30 fold gain in sensitivity of the photocathode.

Another important feature of the novel photocathode is the presence of transparent layer between the fluorescent and photo-sensitive layers. This separating layer being extremely thin, of a few microns only, does not cause any deterioration of sharpness and at the same time prevents chemical interaction of fluorescent and photo-sensitive layers which is the cause of serious complications such as spurious signals, blemishes, etc.

The photo-electric signals or images produced by the novel photocathode can be further intensified by the use of similar composite electrode comprising light reflecting layer, electron fluorescent layer, light transparent separating layer and photo-electric layer, disposed in a single or plural successive stages in the vacuum tube in cooperative relationship with said photocathode.

The invention will be better understood when taken in connection with the accompanying drawings:

In the drawings:

Fig. 1 represents composite photocathode responsive to electron radiation.

Fig. 2 represents composite photocathode sensitive infra-red radiation.

Fig. 3 represents composite photocathode responsive to ultra-violet radiation.

Fig. 4 represents composite photocathode responsive to X-rays and atomic particles radiation.

Fig. 5 represents composite photocathode sensitive to X-ray and gamma radiation.

Fig. 6 represents an alternative form of photocathode sensitive infra-red radiation.

Fig. 7 represents an alternative form of composite photocathode sensitive to X-ray and atomic particles radiation.

Fig. 8 represents composite photocathode responsive to infra-red having photo-sensitive layer of photo-voltaic type.

Fig. 9 represents novel composite electrode.

Fig. 10 represents composite electrodes arranged in successive stages for image amplification.

Fig. 11 represents cascade form of composite electrode.

Fig. 1 represents composite photocathode 1 having light reflecting layer 2, fluorescent layer 3, extremely thin light transparent separating layer 4, and photo-sensitive layer e. g. of photo-emissive type 5. This photocathode is the most suitable for atomic particles radiation such as electrons 6 and for invisible electro-magnetic radiation of wave-length shorter than 2000 A. The electron radiation passes through light reflecting layer 2 of aluminum, is striking the fluorescent layer 3 of ZnSAg or of $BaSO_4$ and is converted therein into fluorescent light which is exciting directly and by reflection from the reflecting layer 2 the photoemissive layer 5 of caesium, lithium or potassium on antimony or bismuth. The transparent separating layer 4 may be of mica, silicon, $ZnF_2$ or of a suitable plastic. This composite photocathode is characterized by marked sensitivity. It is 200 times more sensitive than the conventional photocathode to irradiation by atomic particles or light of wave length shorter than 2000 A. At the same time because of close proximity of fluorescent and photo-emissive layers, the conversion of signals and images is possible with preservation of the sharpness, in spite of the elimination of optical system for projection of said signals or images on said photocathode.

Fig. 2 represents composite photocathode 10 suitable for infra-red radiation. The fluorescent layer 7 may be of alkaline earth sulphides or selenides activated by cerium, samarium or by CuPb. This fluorescent layer converts the infra-red signals 10a into fluorescence of 600–1000 millimicrons wave-length, which is exciting the photoemissive layer 9 of CsOAg or of CsO and is producing photoelectron emission. The transparent separating layer 8 may be of mica, silicon, or of a suitable plastic. This composite photocathode is responsive to infra-red signals or images which would not be able to activate any known at present photocathode.

Fig. 3 illustrates composite photocathode 11 sensitive to ultra-violet radiation 11a. The fluorescent layer 12 is of calcium phosphate with activators, or of calcium silicate or barium silicate with activators. The light transparent separating layer 13 is of mica, silicon or a suitable plastic. The photo-electric layer 14 is of caesium or potassium on antimony. The fluorescent layer 12 when excited with short U.-V. radiation 11a converts it into ultra-violet fluorescence of 3,000–3800 A wave-length, which is able to excite the photo-electric layer 14. The advantage of this novel photocathode is, besides its sensitivity, the fact that it is responsive to very short ultra-violet, to which none of the present photocathodes is sensitive.

Fig. 4 shows composite photocathode 15 which is sensitive to X-rays and atomic particles radiation. This photocathode comprises light reflecting layer 16 such as, of aluminum, fluorescent layer 17 of ZnSCdSAg, $BaSO_4$, or of tungstate. The separating layer 18 is light transparent and may be of mica, silicon, $ZnF_2$ or of suitable plastic. The photo-electric layer 19 is of photo-conductive type and may be of selenium, ZnS, CuS, PbS or of thallium sulphide. The signal plate 20 is of conductive metal. The invisible X-ray radiation 21 is converted into fluorescent light in the layer 17. The fluorescent light irradiating the photo-conductive layer 19 changes its resistence producing thereby electrical signals modulated by the pattern of said invisible X-ray image. The electrical signals flow through the signal plate 20 to appropriate receivers.

Fig. 5 illustrates an alternative form of the photocathode shown in the Figure 4. In this embodiment of the invention the photocathode 15a comprises light reflecting layer 16, fluorescent layer 17, light transparent layer 18, photoconductive layer 19, another fluorescent layer 17a and signal plate 20. This type of photocathode is very sensitive to X-rays and gamma rays. The photo-conductive layer 19 is in this form of invention irradiated by the fluorescent light from both sides, from layer 17 and 17a, producing double photo-conductive effect.

Fig. 6 illustrates variety of photo-conductive photocathode 23 suitable for infra-red radiation 28. The fluorescent layer 24 is of alkaline earth sulphides or selenides activated by cerium, samarium or europium. The separating light transparent layer 25 is of mica, silicon or of suitable plastic. The photo-conductive layer 26 is of selenium, ZnS, Cus, Pbs or of thallium sulphide. The signal plate of conducting metal 27 serves to transmit electrical signals modulated by infra-red image to appropriate receivers.

The photo-conductive composite photocathode may be also made sensitive to ultra-violet radiation by making the fluorescent layer 24 of said photocathode 23 of ZnSAg, of $BaSO_4$ or of calcium or barium silicates with proper activators.

Fig. 7 illustrates photo-voltaic type of composite photocathode 28 having light reflective layer 29, for example, of aluminum, fluorescent layer of ZnS, CdSAg, germanates or of ZnSCu 30, light transparent layer of mica, silicon or of suitable plastic 31, photo-voltaic layer of $Cu_2O$ on Cu 32 and signal plate 33 of conductive metal. The invisible X-ray radiation 34 is converted in the fluorescent layer 30 in the fluorescent light which is exciting the photo-voltaic layer 32 directly and by reflection from the reflecting layer 29 causing differences in potential over the surface of said photo-voltaic layer. These differences in potential have the pattern of the original invisible X-ray image. They are conducted in the form of electrical signals by the signal plate 33 to appropriate receivers.

Fig. 8 shows an alternative form of photo-voltaic photocathode which is sensitive to radiation of long wave-length such as infra-red 10a. This composite photocathode 39 consists of fluorescent layer 35 of alkaline earth sulphides or selenides activated by cerium, samarium or europium, of light transparent layer 36 of mica, silicon or of suitable plastic; of photo-voltaic layer 37 of $Cu_2O$ on Cu and of metallic signal plate 38. The infra-red radiation is converted by the fluorescent layer of said photocathode into fluorescent light which exciting said photo-voltaic layer causes differences in potential over its surface. These differences in potential have the pattern of original infra-red image. They are converted into electrical signals and are conducted by the signal plate to receivers.

Fig. 9 illustrates composite electrode 45 in vacuum tube 40 for intensification of signals or images. This novel electrode can be used for signals or images of all types of radiation. It has light reflecting layer 41, which is transparent to electrons, layer fluorescent under electron irradiation 42, light transparent layer 43 and photo-emissive layer 44. In particular the light reflecting layer 41 may be of aluminum, the electron fluorescent layer 42 of ZnSAg or of BaSO$_4$, the light transparent separating layer 43 may be of caesium, potassium or lithium on antimony or bismuth. As images of all types of invisible radiation may be converted by a suitable composite photo-emissive photocathode, as described above, into photo-electron image, the novel electrode which is electron-sensitive may serve for intensification of signals and images whether they are produced by U.-V., I-R, gamma rays or by atomic particles. In the Figure 9, we see intensification of electron image by said composite electrode 45. The electron beam 46 carrying the invisible electron image, such as e. g. radar image is focused on the composite electrode 45. The electron image passes through the light reflecting layer 41, is converted by the fluorescent layer 42 into fluorescent image and said fluorescent image is exciting photo-emissive layer 44, whereby intensified photo-electron image having the pattern of the original radar image is obtained and may be now reconverted into visible image, if so desired. This process of intensification may be repeated a few times using said composite electrodes in a few stages, whereby additional intensification is obtained. In case of radar images the fluorescent layer in the composite electrode 45 should be in some instances of a long persistence, in order to avoid the flicker. Such persistent fluorescent phosphor may be of single layer type such as e. g. Zn(Mg)F$_2$:Mn or other fluorides, ZnSCu(Ag); Cs$_2$P$_2$O$_7$:Dy or ZnSCdS:Ag:Cu. Sometimes it is more advantageous to use cascade type of fluorescent screen consisting of two or more layers, as illustrated in the Figure 11. In this form of invention the composite electrode 45a has the fluorescent layer 42a comprising two layers 42b and 42c such as e. g. ZnS(Ag) on ZnS:CdS:Cu or Al$_2$O$_3$ on ZnS:(Ag). Obviously there are many combinations of cascade long persistent fluorescent screens which can be used in this invention. The remaining parts of the composite electrode 45a such as light reflecting layer 41a, light transparent separating layer 43a and photo-emissive layer 44a are as described above.

The application of the composite electrode 45 for visible light image amplification is shown in the Figure 10. The visible light image 47 projected by the optical system 51 causes photo-emissive effect in the photocathode 48 disposed in the vacuum tube 49. The photo-electrons released from the photocathode 48 and having pattern of said light image strike the composite electrode 45, and produce intensified fluorescent image in the fluorescent layer 42 of said composite electrode. The intensified fluorescent image directly and by reflection from the light reflecting layer 41 is exciting the photo-emissive layer 44, producing intensified secondary photo-electron image. This intensified secondary photo-electron image having the pattern of the original light image may be projected on the next composite electrode 57 having light reflecting layer 53, electron-fluorescent layer 54, light transparent separating layer 55 and photo-emissive layer 56 whereby additional intensification is achieved. This process may be repeated in a few stages resulting in marked intensification of the original light image, before reconverting said intensified secondary photo-electron image into final visible image for inspection or recording. This system of light image amplification was never accomplished successfully before as in previous systems the absence of the light reflecting layer 41 in the composite electrode 45, caused back-scattering of the fluorescent light from the fluorescent layer 42 to the photocathode 48, destroying thereby completely the image.

It is obvious that the novel composite photocathode and composite electrode may be used in every signal or image reproducing or transmitting system. In particular they will be used in photo-tubes, electron multipliers, image converters, image amplifier tubes as well as television pick-up tubes, whenever the presently known photo-cathodes are not responsive or not sensitive enough to the depicting radiation.

Although the preferred embodiments of the invention have been described it will be obvious to those skilled in the art that various changes and modifications may be made without departing from the true spirit and scope of this invention.

What I claim and want to protect by Letters Patent of the United States:

1. In a vacuum tube, a composite screen comprising a luminescent layer deposited on a wall of said tube, a light transparent separating layer in contact with said luminescent layer, said light transparent layer having a thickness of the order of microns, and a photosensitive layer in contact with said light transparent layer.

2. In a vacuum tube, as defined in claim 1 wherein said photosensitive layer is photoemissive.

3. In a vacuum tube, as defined in claim 1, wherein said luminescent layer comprises a plurality of layers of different phosphors.

4. In a vacuum tube, a composite screen comprising a luminescent layer deposited on a wall of said tube, a light transparent separating layer of the order of microns in contact with said luminescent layer, and a photoconductive layer in contact with said separating layer.

EDWARD EMANUEL SHELDON.

REFERENCES CITED

The following references are of record in the file of this patent:

UNITED STATES PATENTS

| Number | Name | Date |
| --- | --- | --- |
| 2,198,479 | Langmuir | Apr. 23, 1940 |
| 2,200,853 | Porter et al. | May 14, 1940 |
| 2,233,786 | Law | Mar. 4, 1941 |
| 2,258,436 | Von Ardenne | Oct. 7, 1941 |
| 2,259,372 | Geisler | Oct. 14, 1941 |
| 2,297,478 | Kallmann et al. | Sept. 29, 1942 |
| 2,435,436 | Fonda | Feb. 3, 1948 |
| 2,452,523 | Leverenz | Oct. 26, 1948 |
| 2,473,220 | Rose | June 14, 1949 |
| 2,476,619 | Nicoll | July 19, 1949 |